United States Patent
Baransky et al.

(10) Patent No.: US 6,636,533 B1
(45) Date of Patent: Oct. 21, 2003

(54) METHOD FOR DISTRIBUTING DIGITAL TV SIGNAL AND SELECTION OF CONTENT

(75) Inventors: Yurij Baransky, Montrose, NY (US); Hubertus Franke, Cortlandt Manor, NY (US); Pratap Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/556,734

(22) Filed: Apr. 21, 2000

Related U.S. Application Data

(62) Division of application No. 09/256,520, filed on Feb. 23, 1999, now Pat. No. 6,122,660.

(51) Int. Cl.$^7$ ............................... H04L 7/08; H04L 7/58
(52) U.S. Cl. ..................... 370/542; 370/487; 370/493; 725/36; 725/40; 725/142; 348/14.07; 348/423.1
(58) Field of Search ................................. 770/412, 432, 770/437, 477, 480, 486, 487, 493, 522, 527, 528, 536, 537, 542, 543; 348/14.07, 423.1, 432.1, 384.1; 725/40, 136, 41, 42, 43, 44, 32, 36, 135, 61, 142

(56) References Cited

U.S. PATENT DOCUMENTS

| 5,148,272 | A | * | 9/1992 | Acampora et al. | ........ | 275/240.1 |
| 5,461,619 | A | * | 10/1995 | Citta et al. | .................. | 370/468 |
| 5,493,339 | A | * | 2/1996 | Birch et al. | ................. | 348/461 |
| 6,055,244 | A | * | 4/2000 | Wall et al. | ................... | 370/487 |
| 6,122,660 | A | * | 9/2000 | Baransky et al. | ........... | 709/217 |
| 6,157,809 | A | * | 12/2000 | Kambayashi | ................ | 725/91 |

\* cited by examiner

*Primary Examiner*—Hassan Kizou
*Assistant Examiner*—Ahmed Elallam
(74) *Attorney, Agent, or Firm*—Scully, Scott, Murphy & Presser; Douglas W. Cameron, Esq.

(57) ABSTRACT

The present invention is a process in which broadcasters can supplement existing multimedia streams such as video and audio with additional multimedia streams in a coordinated and integrated way, allowing users, after reception of the broadcast stream, to select which substream to use, without requiring an upstream channel to communicate this user preference back to the server or any additional bandwidth to broadcast these additional streams.

8 Claims, 5 Drawing Sheets

METHOD FOR DISTRIBUTING DIGITAL TV SIGNAL AND SELECTION OF CONTENT

This application is a divisional of U.S. patent application Ser. No. 09/256,520, filed on Feb. 3, 1999 and now issued as U.S. Pat. No. 6,122,660.

BACKGROUND OF THE INVENTION

1. Field of the Invention

The present invention relates generally to multimedia broadcast systems and, in particular, to a method for distributing end-user selectable additional content in a multimedia broadcast stream.

2. Description of Prior Art

The advent of digital television has enabled advances in the area of user selectable content used in conjunction with the traditional broadcast distribution architecture. Besides increasing the number of channels available, content providers are able to provide a range of services far exceeding those available in analog-based distribution systems.

The Vertical blanking interval utilized to transmit data along with the video signal is described in a number of patents, including a U.S. Pat. No. 4,536,268. However, this technique does not allow user interaction.

Other patents, including U.S. Pat. No. 5,512,935, describe the distribution of digital video requiring additional equipment such as a set too box (STB) at the receiver location. Downstream content which is broadcast from a server utilizes the traditional broadcast medium, while upstream content, such as user choices, use the public telephone system co-ordinated via the STB.

U.S. Pat. No. 5,260,778 describes embedding additional controls into digital video streams, and requires an addressable controller to transmit this stream to a receiver.

MPEG-2 Systems Specification, ISO/IEC 13818-1, specifies the MPEG-2 standard for how programs consisting of audio and video elementary streams can be multiplexed together in a "transport stream." The MPEG-2 Systems Specification accommodates the inclusion of "private data" streams into a program's transport stream. "Program-Specific Information" carries the information regarding which elementary streams have been multiplexed in the transport stream, what type of content they carry and how they may be demultiplexed.

The standard encoding and compression of a video stream into MPEG format is well known to those skilled in the art. For completeness purposes the general procedure is summarized here.

Though several variations to the MPEG encoding procedure exist, they are all based on JPEG, a compression standard for single image compression. In JPEG, image Q is transformed into the frequency domain using a Fast Fourier Transform (FFT) resulting in FFT(Q). Since the image is discretized in the frequency domain, losses should be expected when applying the inverse Fourier Transform to obtain the original image.

Before compression, the various frequencies are bit encoded using fewer number of bits for high frequencies and greater number of bits for low frequencies. The reasoning for this is that high frequencies representing changes in the image in the detail are filtered out or can be compensated by the human eye. Hence, less information has to be dedicated to the higher frequency range. In contrast, low frequencies describe the overall image and are not filtered by the eye. The resulting encoded bitstream of FFT(Q) is a representation of the image Q with a potential small error due to the discretization. The image Q can be reconstructed by decoding the bitstream and applying the inverse Fourier Transform to FFT(Q). The encoded bitstream is then compressed using an LZ-Type compression. The compressed image of the original image Q may be denoted by JPEG(Q).

In MPEG this principle is taken further. For a given image stream IS(i), each individual image (I) I(i,j) is compared with its previous individual image I(i,j−1) and the difference image (D) D(i,j) is computed. A difference image can be characterized using:

(i) a shift (u,v) in the image in the (x,y) direction, thus capturing a movement in the image; and (ii) the set of pixels that have changed.

The computational complexity of the MPEG encoding procedure lies in the fact that various combinations of (u,v) have to be tried to obtain a small image D(i,j).

The D(i,j) is then compressed using a bit encoding similar to the one discussed in the JPEG compression. On the average, D(i,j) represents a small image change, the resulting compressed difference image (DC) DC(i,j) is expected to be rather small because most of the image should be the same as the previous and hence will not show up in the FFT.

Due to the fact that a sequence of DC(i,j), where (j=1, . . . , p) 100, shown in FIG. 1, is computed of each other and each DC(i,j) 100 compression can have a marginal error due to the FFT, every so often a whole compressed image I(i,j) has to be transferred to limit error compounding. Such compressed images are called anchor frames, they are created by JPEG compression, i.e., JPEG(I(i,j)), and represented as JC(i,j) 120. By default, the first image I(i,1) must be transferred as an anchor frame JC(i,1). The resulting compressed stream S(i) consists of a sequence of stream parts, each stream part defined to begin with an anchor frame JC(i,j) 120 and subsequent compressed difference images DC(i,j+1) to DC(i,j+p) 140.

Having thus described the general MPEG encoding mechanism, it is shown that the way the main image stream. IS(1) and each additional image stream IS(i) are encoded, is as independent MPEG streams S(i) 130. However, this approach may require additional bandwidth because the entire image part JC(i,j) 120 to DC(i,j+p) 140 has to be transmitted because the difference images are computed of JC(i,j) 120 and its subsequent images.

In providing for some level of customization, additional items beyond a broadcast architecture need to be supplied:

1) a means of communicating user's preferences from the receiver back to the source of the broadcast program, and 2) a separate channel for transmission of the modified content back to the originator of the preference.

These additions add expense and complexity to the broadcast system, i.e., each user must be assigned a separate channel.

What is needed is a method for substantially reducing or eliminating above limitations, all the while retaining the cost and simplicity of a multimedia broadcast architecture would be useful.

SUMMARY OF THE INVENTION

The invention is a system architecture which, in addition to the base stream, enables the broadcast delivery of alternative media segments to a receiver, without a separate broadcast channel for these alternative segments and without a need for an upstream channel for that receiver to indicate which alternative media segment to view.

In one embodiment of the invention the content owners may choose to offer an option of a PG-rated version of a R-rated movie. Most of the movie may be rated PG, however a few segments may give it the R rating. The PG-rated version would be identical to the original except for the substitution of a few brief segments. The base stream would be the R-rated version of the movie, and the alternative segments would be those PG-rated segments which would substitute for the R-rated segments. The invention allowing the user to choose which version to view by broadcasting a combination of the R and PG rated versions without the use of additional upstream or downstream channels.

The base media stream may be compressed using any number of methods. During pauses in the instantaneous bandwidth requirements of the base stream, the compressed alternative media segments are multiplexed with the base media stream to create a combined stream. Typically, the combined stream's instantaneous bandwidth requirement will exceed the channel's capacity to deliver this stream. In those cases the compression of the alternative segments is modified by expanding the delivery time for the alternative segment, hence reducing the combined stream's instantaneous bandwidth requirements. The alternative segments are expanded by an amount great enough so that the combined stream's bandwidth requirements can be satisfied by the channel. Because the alternative segment is expanded in time, the delivery of the alternative segment must be initiated far enough in advance of its use so that it will be present at the receiver at the appropriate time.

Upon receiving the combined stream, the receiver demultiplexes the combined stream into the base stream, and alternative segments. The base stream proceeds through the receiver as usual, while the alternative segments are buffered into some storage and reconstructed into a suitable form for playback at the correct time. The user selects which, if any, of the alternative streams to view, and at the appropriate moment, the reconstructed alternative stream is merged, or replaced, with the base stream and displayed.

The number of alternative streams and their parameters, e.g., duration, quality, etc . . . , that can be encoded into the base stream in this way is determined by the instantaneous bandwidth requirements of the base stream, the channel capacity, the alternative streams parameters and the temporal locations for their display during playback of the base stream. The compression and scheduling of these segments is computed only once.

The number of alternative streams that can be displayed at the receiver is dependent on the above and also on the amount of storage and the processing power at the receiver. If the receiver does not have any storage or processing power, only the base stream is played.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE INVENTION

The present invention introduces interdependent MPEG streams. The compressed stream $S(1)$ of the main image stream $IS(1)$ is MPEG encoded. For all alternative image streams $IS(i)$ and for each image $I(i,j)$ in each $IS(i)$, two different images and their compressed images are generated:

1. $D(i,j)$—the difference image to $I(i,j-1)$ in the same image stream $IS(i)$, compressed $D(i,.j)$ represented by $DC(i,j)$; and
2. $DM(i,j)$—the difference image to $I(1,j)$ in the main image stream, compressed $DM(i,j)$ represented by $DMC(i,j)$.

The smaller of the $DC(i,j)$ and the $DMC(i,j)$ is included into the compressed stream $S(i)$. Similarly, the anchor frames of alternative image stream $IS(i)$ may be defined by a difference image to the corresponding main image.

Figure 1:
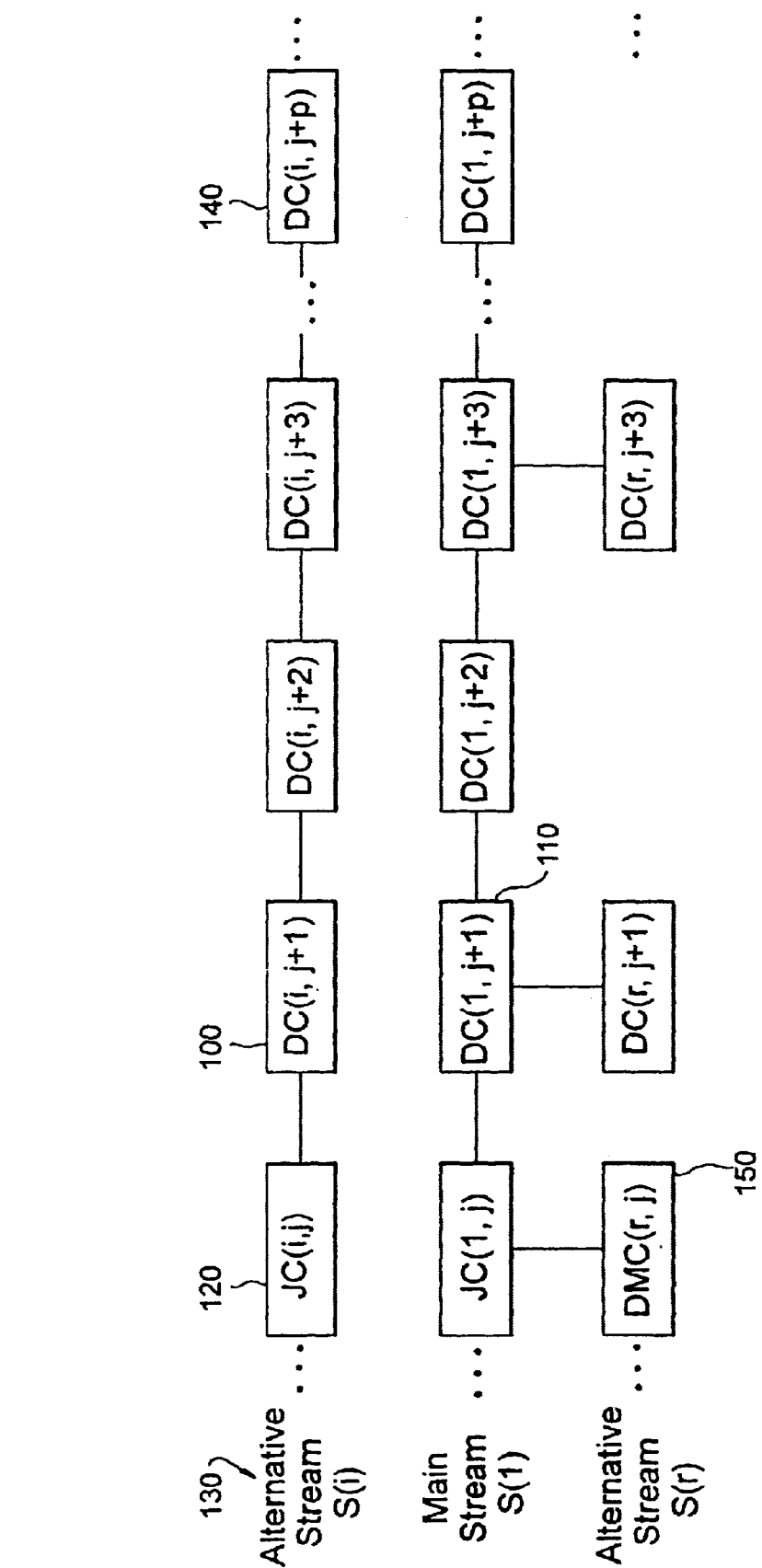
FIG. 1 is a block diagram, showing building blocks of a merged stream of the multimedia broadcast stream.

Shown in FIG. 1, dependent on which of its compressed frames are smaller, either the compressed image anchor frame $JC(i,j)$ 120 or the compressed difference image to the main image stream $DMC(i,j)$ 150 is chosen to be included into $S(i)$. Accordingly, each frame may be marked with its dependency, i.e., whether it is an anchor frame, a difference image in the same image stream or a difference image with respect to the main image stream.

Let $S(i)$, for $i=1, \ldots, M$, be compressed streams, the main compressed stream and the alternative compressed stream, to be merged into the resulting combined broadcast compressed stream (CS). The various broadcast streams, e.g., the main broadcast stream and alternative broadcast streams, are added to the broadcast stream CS using a back filling procedure, which utilizes stream priorities and delivery deadline to send stream information as late as possible due to the following reasons:

1. delivery deadlines are still met, however less storage is required, and
2. the time period in which the end user cannot change the selection is reduced.

For instance, if the user selects the alternative stream 1 instead of the alternative stream 2, the alternative stream 2 is simply ignored while being received, rather than stored, thus minimizing storage requirements. If the packets are sent minutes before they are actually up for display, then the end-user cannot change his/her mind to switch to the alternative stream 2 because the content of the alternative stream 2 was not stored.

Each digital TV stream $S(i)$ is decomposed into a sequence of packets $P(i,j)$, where $j=1, \ldots, N$, and the packet number j corresponds for all streams $S(i)$ to the same fixed discrete time $t(j)$, including the same viewing time boundary. Typically, the discrete times $t(j)$ are equidistant. In practice the main stream is expected to dictate the point in viewing time where a packet is created. For example, if the main stream is MPEG encoded, the anchor frames may serve as the beginning of a packet. Alternatively, the frames of a compressed stream ($JC(i,j)$, $DC(i,j)$ and $DMC(i,j)$ may be mapped directly onto a packet (P) $P(i,j)$. However, the encoding scheme of different streams is orthogonal to the has combining procedure. Each packet $P(i,j)$ of stream $S(i)$ has an implied packet priority (PP) $PP(i,j)$. In the most practical approach each stream $S(i)$ is assigned a unique priority (SP) $SP(i)$ and all packets $P(i,j)$ inherit this priority, thus $PP(i,j)=S(i)$ for all j.

Without the loss of generality the streams may be ordered in such a manner that $i1<i2$ implies that $SP(i1)<SP(i2)$. Note that for practical purposes the main stream will typically be assigned the first stream as it has the highest priority.

The transmission capacity (C) of the underlying broadcast communication medium is denoted to be C(j) at time t(j). Though the method works for variable transmission capacity, for all practical purposes, a constant sustainable peak capacity should be assumed as the merging procedure is offline and variable transmission capacities are hard to predict.

Let B(i,j) denote the capacity consumed in transmitting P(i,j). Since all streams, i.e., packet sequences, are aligned in time B(i,j)=0 is used to indicate that stream S(i) at time t(j) has nothing to send, hence no explicit packet P(i,j) exists and hence the packet is not transmitted. Furthermore, the entity that is used to hold data/information for the combined stream at time. t(j) may be denoted as the communication bucket CB(j). By definition the capacity of the CB(j)=C(j). Packets from various streams are added, satisfying their delivery deadlines until the capacity of CB(j) reaches C. Note that the packets P(i,j) are not directly related to the packet size of the underlying communication system as they may occupy part of a packet or many communication packets. Rather the sequence of CB(j) comprise the combined stream, which for the purpose of distribution is considered a single stream, albeit with some specialized encoding/decoding. Hence, it is the task of the underlying broadcast medium to distribute these communication buckets and the information stored therein. The broadcast distribution of a single medium as defined by CB(j) is well defined in the prior art of this invention.

Figure 2:
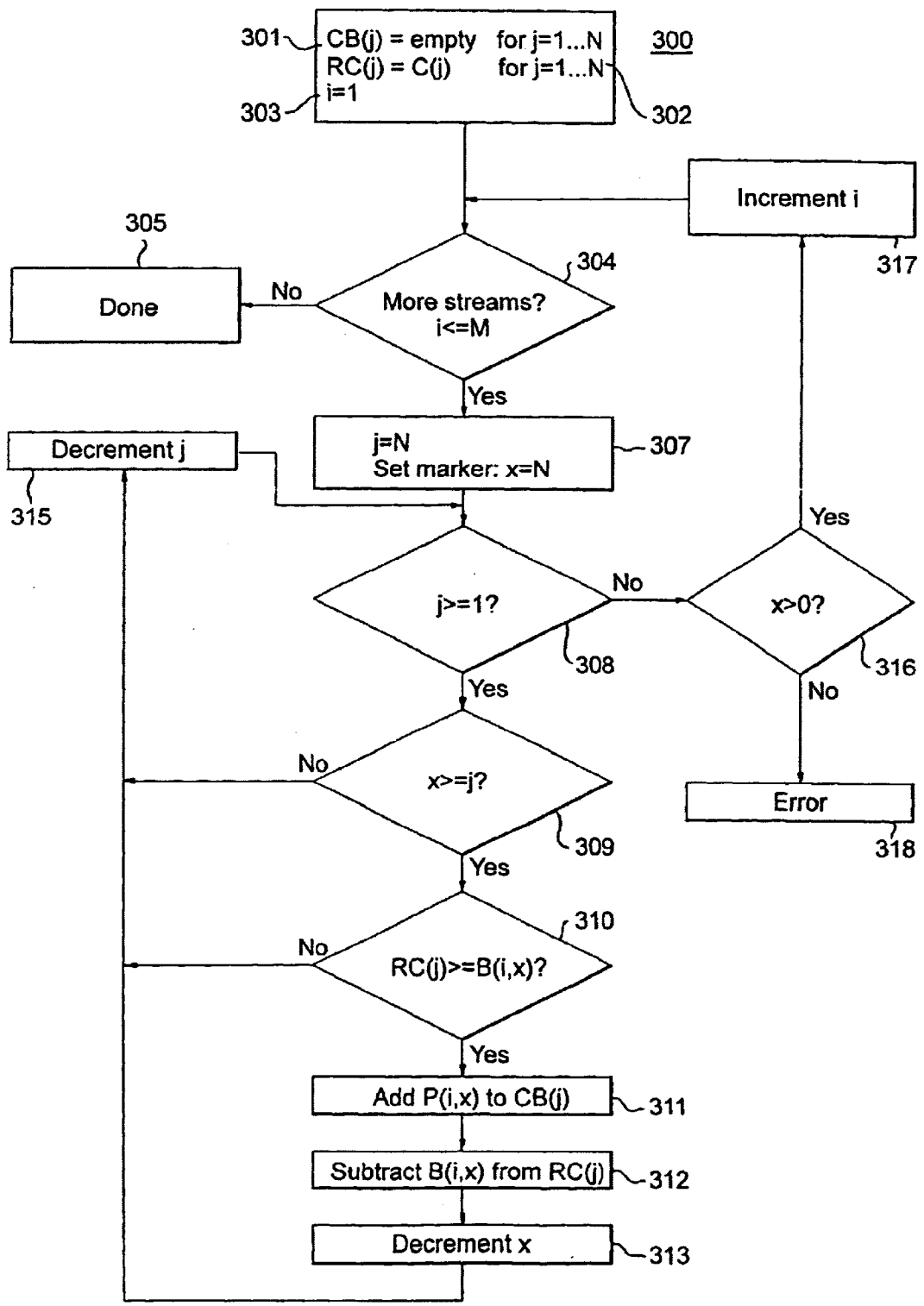
FIG. 2 is a logical diagram, showing the program flow of the merging of the streams in preparation for distribution of the combined stream.

Having thus described the notation and boundary conditions, FIG. 2 shows the stream merging or compression method. During the initialization phase 300 all communication buckets (CB) CB(j) for all time stamps j=1, . . . , N are emptied out at step 301. The remaining capacity (RC) RC(j) is initialized to C(j), as no streams have been considered for merging at step 302. Furthermore the current stream number i is set to 1 at step 303.

Having thus an empty valid combined stream CS, the method proceeds in merging of the next stream. A determination is made at step 304 whether stream S(i) is the last stream S(M). If it is, the method terminates at step 305. Otherwise, each merging of an additional stream S(i) into the current combined stream CS is preambled by an initialization phase where 1. a marker x is positioned at the end of the stream S(i), i.e., x=N, at step 307, and
2. a j loop is initialized starting at the latest time stamp j=N at step 306.

Packets from the S(i) current stream marker x to the current value of j are further considered. It is an invariant of this loop that x is always greater or equal j, because otherwise P(i,x) would be only available after its deadline t(j). A packet can be merged if the current remaining capacity RC(j) at communication bucket CB(j) is equal or greater the required capacity of the currently considered packet P(i,x), i.e., the latest packet of S(i) that has not been merged yet into the combined stream.

At step 308 a determination is made whether the first time stamp j=1 has been reached. If it has been, all time stamps for this Particular stream merging have been considered, i.e., the j-loop is finished, then at step 316 a verification is made whether the entire stream S(i) was merged into the combined stream CS, which is true if x=0.

If the entire stream S(i) was merged into the combined stream CS, a valid combined stream CS comprised out of streams S(1), . . . , S(i) has thus been obtained, the next stream S(i+1) is then recursively merged into the CS by incrementing i by 1 at step 317 and continuing processing at step 304. Otherwise, not enough excess capacity could be found along the CS to add S(i) and error must be raised at step 318.

A determination is made at step 309 if x>=j and at step 310 whether there is no remaining capacity RC(j) available, such that RC(j)>=B(i,x), which indicates that the delivery deadline of P(i,x) was not met, requiring to try the earlier time stamp by decrementing j at step 315 and proceeding to step 308.

If the determination in both cases is positive, i.e., x>=j and RC(j)>=B(i,x), then the packet P(i,x) is added to the communication bucket CB(j) at step 311. The remaining capacity RC(j) is reduced by the consumed capacity B(i,x) of P(i,x) at step 312. Variable x is decremented at step 313 and variable j is decremented at step 315 and the possible merging in of yet unmerged previous packets P(i,x-1) is continued at an earlier time stamp (j-1).

The above described method may be represented using the pseudo code as shown in Table 1.

TABLE 1

```
// initialize global
for j=1..N by step 1
do
    CB(j) = empty
    RC(j) = C(j)
done
i = 1
// merge stream by stream
for i=1..M by step 1
do
    // initialize single merge
    x = N // set stream marker
    // merge the current stream
    for j=N..1 by step -1
    do
        // try to merge packets that can not be sent later
        while (x>=j) and (RC(j) >= B(i,x))
        do
            add P(i,x) to CB(j)
            Subtract B(i,x) from RC(j)
            x = x-1
        done
    done
    if (x>0)
    then
        raise error "can't fit stream S(i)"
        exit
    end
done
```

Table 2 shows an alternative possible representation. In this example, the priority of packets within a stream is not constant. In this case multiple markers x(i) have to be maintained and at each time stamp j an ordered list (OL) of B(i,x(i)) for all i is determined.

TABLE 2

```
// initialize global
for j=1..N by step 1
do
    CB(j) = empty
    RC(j) = C(j)
done
for i=1..M by step 1
do
    x(i) = N
done
for j=N..1 by step -1
do
    label order:
        create ordered list OL(1..M) of streams with
            a < b implies PP(i,x(OL(a)) >= PP(i,x(OL(b))
            and x(OL(a)) >=j and x(OL(b)) >= j OR
            implies x(OL(a)) >= j and x(OL(b) < j
```

TABLE 2-continued

```
    i=1
    while i<=M
    do
        if (x(i)>=j) and (RC(j) >= B(i,x(i))
        then
            add P(i,x(i)) to CB(j)
            subtract B(i,x(i)) from RC(j)
            x(i) = x(i) -1
            goto order
        end
        i=i+1
    done
done
// verify that all streams got merged
for i=1..M by step 1
do
    if (x(i)>0)
    then
        raise error "can't fit stream S(i)"
        exit
    end
done
```

Ultimately, this representation leads to the same result if streams are ordered, albeit at a higher price as this procedure requires more computation due to the frequent sorting.

Meta information about the availability of the various streams and their constraints and attributes have to be transmitted as well. This information can be presented to the combining procedure as an additional stream with lowest priority.

Figure 3:
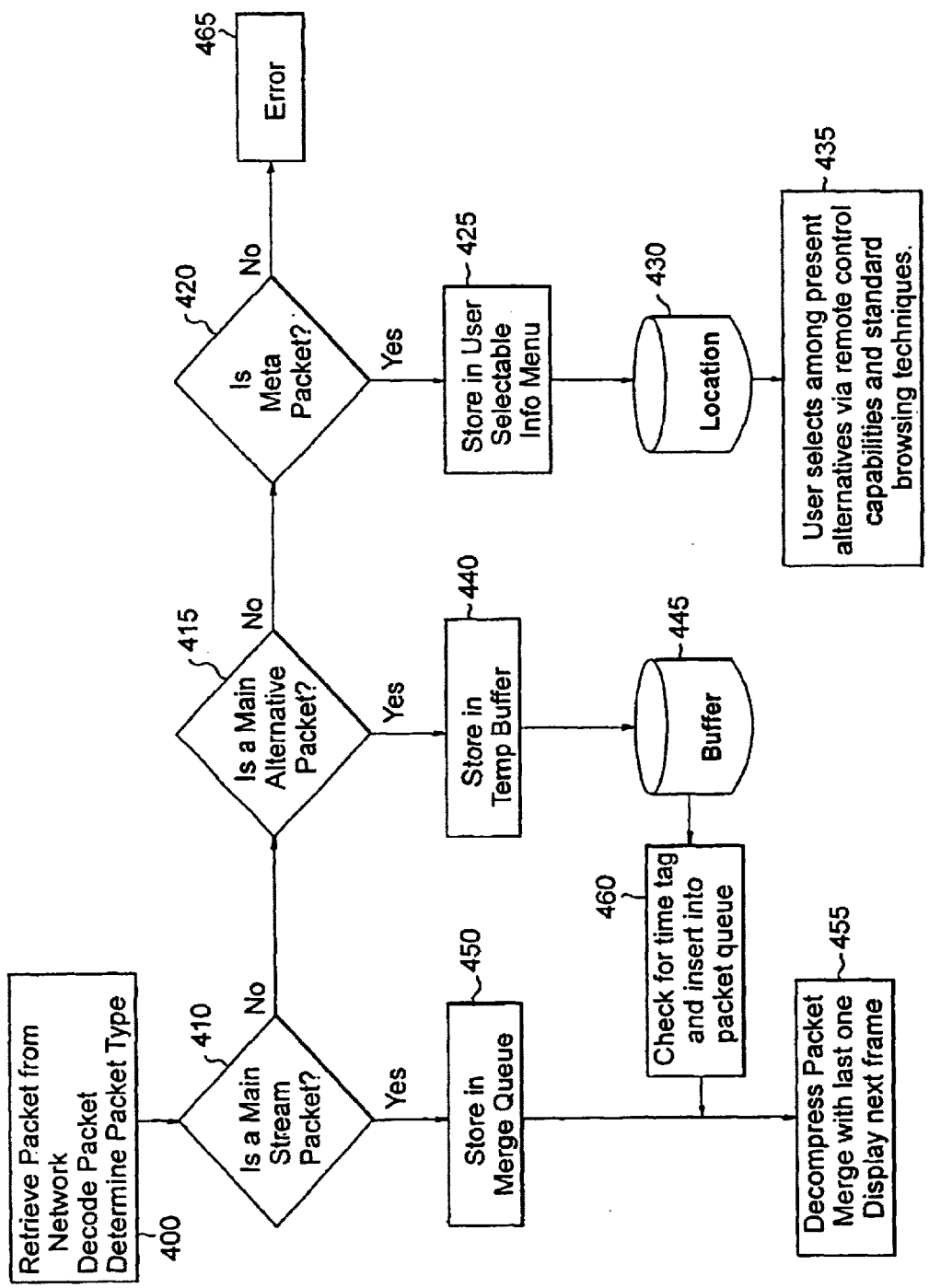
FIG. 3 is a logical diagram, showing the program flow of the receiver.

Having thus described creating a single combined broadcast stream that satisfies all timing constraints, and being delivered via ordinary broadcast equipment, we now turn to describing the receiver end shown in FIG. 3.

Packets arriving as part of the combined broadcast stream at the receiver/tuner are demultiplexed based on their packet stream identity. Three packet types are distinguished:
  main stream packets,
  alternative stream packets, and
  meta data stream packets A packet of CS arriving at the receiver is decoded at step 400 based on its stream selector. If the stream selector identifies a packet of the meta information stream at step 410 as not a main stream packet, at step. 415 as not the alternative stream packet and at step 420 as not a meta data stream packet, the packet is determined to be unrecognizable and error processing will commence at step 465.

If at step 420, the packet is recognized as a meta data stream packet, the receiver box at step 425 stores the information at location 430, to make it accessible by the end-user at step 435 through menu driven means, such as an on-screen remote control user selection.

The menus may present the user with the list of available streams and attributes associated with each of these streams, e.g., language, PG rating etc. The user may then select which alternative stream S(i) if any to watch. The main stream may be selected for viewing by default. The selection may then be stored and used to filter further packets from the combined stream.

If the stream selector identifies an alternative stream packet at step 415, this packet has to be merged with the main stream. Due to the combining method, it is possible that these packets come in advance of their delivery time deadline. For that reason, at step 440, the packets may be stored in buffer 445 until their delivery deadline or show time. If the temporary buffer 445 is exhausted, newly arriving alternative packets may be stored in the storage device associated with the buffer. This function may be managed by the memory and a storage management module. Priority has to be given to the selected alternative stream.

The memory manager presents the next compressed image of the selected alternative channel to the decompression unit at step 460 and presents it for merger with the main stream. Dependent on the type of image dependency the following behavior is implemented by the merging method.

Arriving packets determined at step 410 to be the main stream packets, arrive approximately at their deadline, since the main stream S(1) is the overall driving entity of the viewing. Therefore, at step 450, they are decompressed and the image is directly passed onto the main merging queue.

If the next main stream image is a difference image, at step 455 it is applied to the previously generated image and passed on to the merger with the alternative stream. If it is an anchor frame it is directly passed on to merger with the alternative stream.

At step 460, the memory manager presents the next compressed image of the selected alternative channel to the decompression unit and presents it for merger with the main channel. Dependent on the type of image dependency the following behavior is implemented by the merging method.

If the next image on the alternative stream falls onto the same time stamp then, at step 460 it is merged with the main image. Otherwise, the main image is passed on to the display engine. If the alternative stream presents an anchor frame, then this anchor frame replaces the anchor of the main stream and is passed on to the display engine. If it represents a difference image, either to the main stream or to the previous image in its own stream, the difference is applied to the current image.

Computing the Multiplexed Media Stream at the Server End

Figure 4:
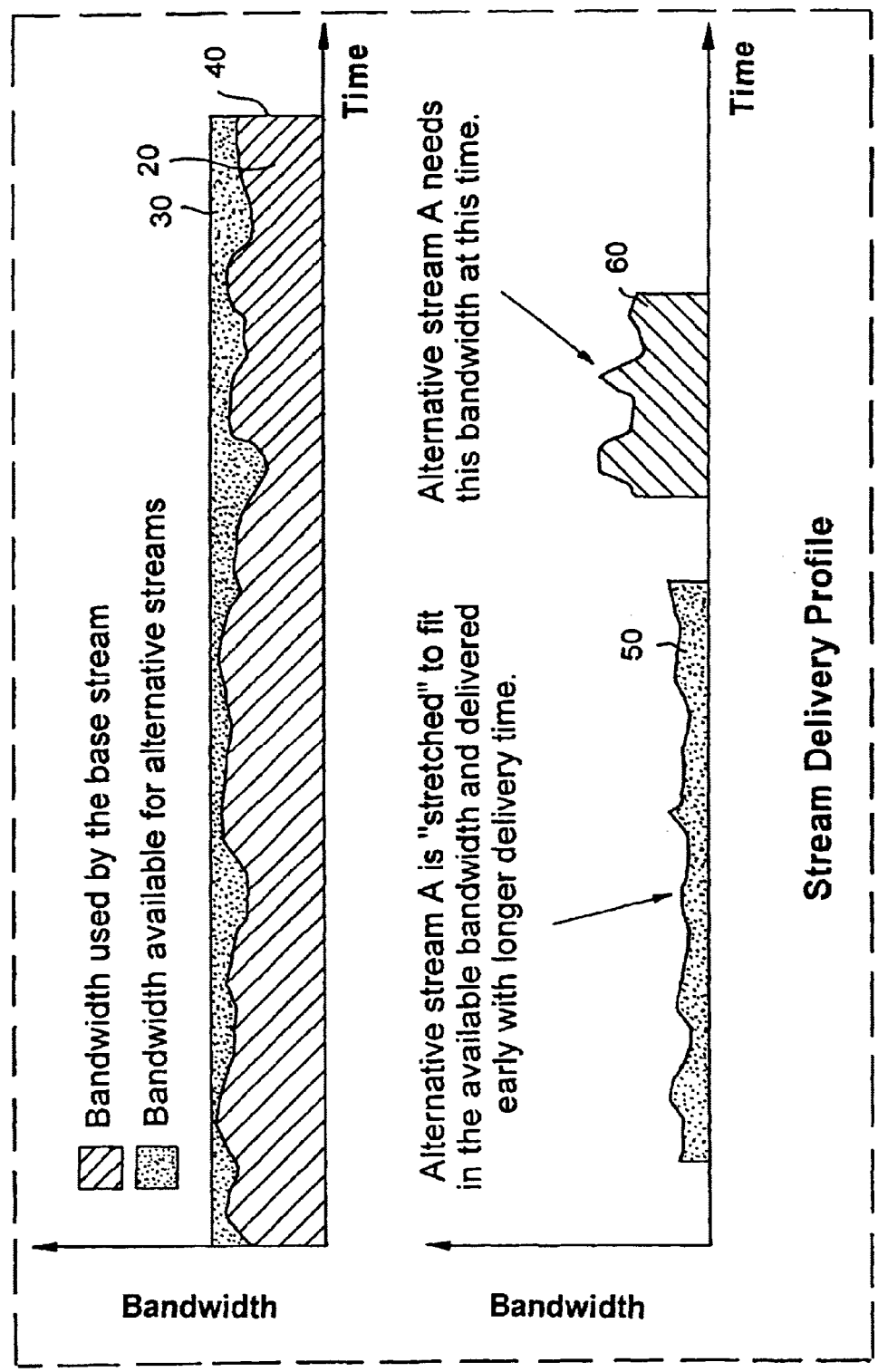
FIG. 4 is a Bandwidth by Time graphical representation of a stream delivery profile.

The base stream is compressed using any of a number of well-known compression techniques with a certain quality, for example the MPEG-2. As shown in FIG. 4, because of the nature of multi-media, the instantaneous bandwidth requirements of the compressed base stream 20 varies over time. Any variation implies that there is channel bandwidth that is available for use. Precisely during those periods of channel availability, a compressed version of the alternative stream 30 is multiplexed with the base stream to produce the broadcast stream 40. The multiplexed stream is computed only once and can be done off-line.

The combined bandwidth of the compressed base stream and the alternative stream usually exceeds the channel bandwidth. The invention overcomes this constraint by:

1. Stretching the delivery time of the alternative stream to reduce the alternative stream's bandwidth requirement. Preferably, the delivery time is stretched until the instantaneous bandwidth requirement of base stream and the alternative stream is within the channel limit. The channel does not need to continuously have this extra capacity for the duration of the alternative stream broadcast, i.e., there could be several isolated pockets of excess capacity. If the total excess capacity preceding the moment when the alternative stream is needed, then this alternative stream may not be multiplexed, at this quality, with the base stream;

2. Delivering of the alternative stream far enough in advance so that it arrives at the receiver in time for its use. The arriving alternative stream needs to be buffered on the receiver until it is ready to play; and, 3. Encoding meta-information into the multiplexed stream in order to: distinguish the alternative stream(s) from the base stream, tag the alternative stream(s) start and stop location in the multiplexed stream, send commands to the receiver, i.e., announce the existence of N alternative streams, and indicate when and where to display them during the base streams display.

This occurs while leaving the base stream unmodified.

In the case of several alternative streams, a possible encoding of these streams is to treat each segment in turn with the above procedure with the caveat that while an alternative stream 50 is broadcast, it uses all the available excess channel bandwidth. The next stream 60 simply starts off where the previous one ended. Each new stream is tagged with a unique identifier (for that base stream) and a class identifier (described in the stream control section). At periodic intervals, the current stream tag and class are inserted into the broadcast stream. This simplifies the meta-information format, and the processing required to demultiplex the streams at the receiver.

Demultiplexing the Stream at the Receiver

Figure 5:
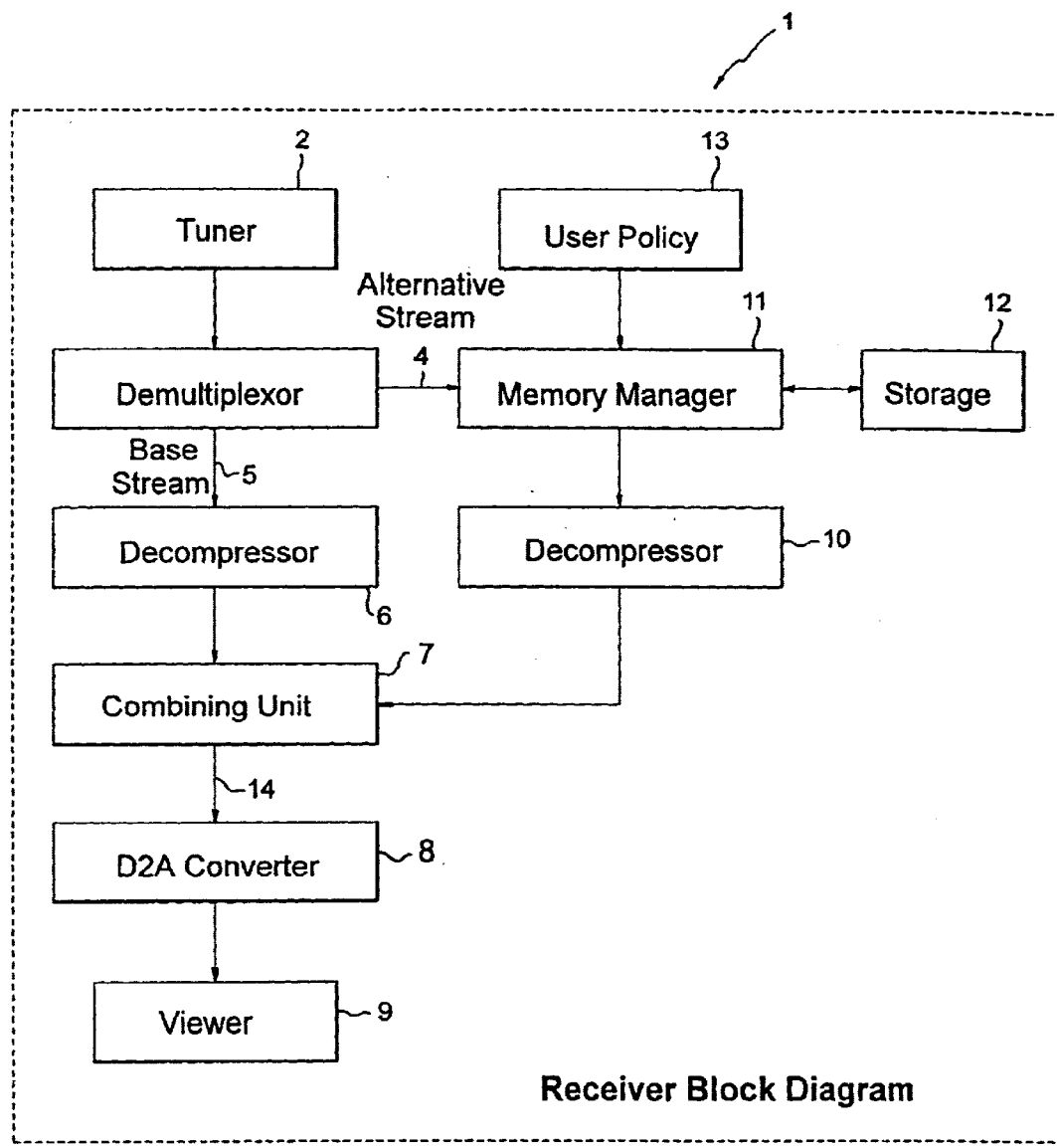
FIG. 5 is a receiver block diagram, showing flow of the base and alternative broadcast streams at the user equipment.

FIG. 5 illustrates a receiver including a tuner 2 to tune to a particular channel. The receiver 1 demultiplexes the incoming stream associated with this channel in demultiplexor 3 into the alternative stream 4 and the base stream 5. Each stream follows a different path.

The base stream 5 flows in real-time. It is decompressed by decompressor 6 and sent to the combining processor 7. The combining processor 7 is responsible for merging the decompressed base stream 5 with any decompressed alternative stream 4 depending on the users choice or policy 13. The timing and location of the merging, where only a section of the base stream may be affected, is determined by the meta-data which is sent with the broadcast. After combining 7 the merged stream 14 is converted into an analog form in a digital to analog converter 8 for display on the viewer monitor 9.

The alternative streams 4 are accumulated in the storage area 12. Logically, each alternative stream 4 is stored in a different location of storage 12. This location is a function of a unique stream tag. The duration of time the alternative stream 4 requires storage in the storage area 12 extends from the first instant the stream arrives at the receiver 1 to the last instant the combined stream 14 is displayed on the viewer monitor 9.

If the receiver 1 has enough storage 12, all the alternative streams are stored in this storage area 12. Otherwise, only the alternative stream which met the user's preference 13 is retained. Storing all the streams has the advantage of allowing the user to change their alternative stream 4 preference during the course of the broadcast and still be able to view the already transmitted alternative streams 4 for that preference. In the opposite extreme, if the receiver's storage 12 space is too small or non-existent for even one stream at the given size, then that stream is dropped. Intermediate cases depend upon a storage policy implemented in storage unit 12. This policy is assisted by the priority tag of the alternative stream 4.

If the user switches to another channel, the stored alternative streams are now unallocated with current base stream and they will not be combined with the new base stream. Storage is reclaimed according to the policy of storage unit 12. It could range from delaying new alternative stream 4 storage, i.e., surf mode, where the user returns to this channel and wants to retain the already present alternative information, to treating all unassociated alternative stream memory as available for new stream storage.

At some instant determined by the meta data the alternative stream 4 needs to be merged with the base stream 5. Only then is the stored alternative stream decompressed in decompressor 10 and sent to the combining processor 7, where it is combined with the base stream 5 as previously described.

Stream Meta Data

An amount of meta-information needs to be transmitted along with the streams. Each base stream must have the following information:

A unique base stream identifier to distinguish base streams 5; and,

A dictionary of alternative stream types in this broadcast, which is displayed to the user to aide in selecting which alternative stream classes to view. These classes may be determined by a universal rating agency or the content producer. This information can uniquely pick out a single alternative stream, or a set of them, depending on what the base stream dictionary is.

Each alternative stream must have the following information:

1. The start time with respect to the base stream
2. The duration of the stream, where non-contiguous segments are considered to be separate segments.
3. The storage required to buffer this stream.
4. A alternative stream identifier unique within this base stream.
5. A tag indicating which unique base stream this stream is associated with.
6. A tag indicating the current time of this base stream.
7. A content identifier tag describing the type/purpose of this alternative segment, e.g., another language, violent content, etc.
8. A priority tag to assist the storage unit's policy in determining which stream to drop when there is storage contention.

This set of information is periodically transmitted during the broadcast as well as during the beginning of each stream broadcast.

User Selection

On viewer display screen, the user is presented with a menu of alternative stream content type. This is based on the dictionary which is transmitted with the base stream. The user may select a viewing policy associated with a particular base stream by making a selection of a stream type for viewing.

When another base stream starts playing, e.g., the original base stream ends, or a commercial starts playing, or the user changes channels, then the current policy is stored in unit 6 and a new policy begins. The new policy can be a previously recorded policy, i.e., all commercials share the same policy, or a default policy, such as, play only the base stream.

The user policy is recorded in storage unit 12, where it may be used in the memory management policy. It is used to select which of the alternative streams is selected for eventual merging with the base stream.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by Letters Patent is:

1. A method for interactively displaying a digital multimedia single broadcast stream including a main data stream and at least one alternative data stream providing timely data relating to said main data stream, said method comprising steps of:
   a. receiving said single broadcast stream at a user device, said single broadcast stream including meta data for describing said main data stream and alternate data streams on said user device, said alternate streams having been scheduled for combination with said main data stream in said single broadcast stream in a manner to guarantee timely delivery with respect to said main stream;
   b. demultiplexing said single broadcast stream at the receiving location to recover said main data stream;
   c. enabling a user to select one or more alternate streams based on said meta data description; and
   d. merging such user selected one or more alternate data streams with said main data stream for displaying on said user device, whereby timely delivery of a selected alternative data stream is guaranteed.

2. The method of claim 1, wherein said enabling step includes storing only selected alternative data streams prior to merging.

3. The method of claim 2, wherein said user device uses said meta data to inform a user of availability and content of said alternative data streams.

4. The method of claim 3, wherein said alternative data streams are stored in said user device until they are either merged for display or discarded.

5. A computer program device readable by a machine, tangibly embodying a program of instructions executable by a machine to perform method steps for interactively displaying a digital multimedia single broadcast stream including a main data stream and at least one alternative data stream providing timely data relating to said main data stream, said method comprising steps of:
   a. receiving said single broadcast stream at a user device, said single broadcast stream including meta data for describing said main data stream and alternate data streams on said user device, said alternate streams having been scheduled for combination with said main data stream in said single broadcast stream in a manner to guarantee timely delivery with respect to said main stream;
   b. demultiplexing said single broadcast stream at the receiving location to recover said main data stream;
   c. enabling a user to select one or more alternate streams based on said meta data description; and
   d. merging such user selected one or more alternate data streams with said main data stream for displaying on said user device, whereby timely delivery of a selected alternative data stream is guaranteed.

6. The method of claim 5, wherein said enabling step includes storing only selected alternative data streams prior to merging.

7. The method of claim 6, wherein said user device uses said meta data to inform a user of availability and content of said alternative data streams.

8. The method of claim 7, wherein said alternative data streams are stored in said user device until they are either merged for display or discarded.

* * * * *